Figure 1:
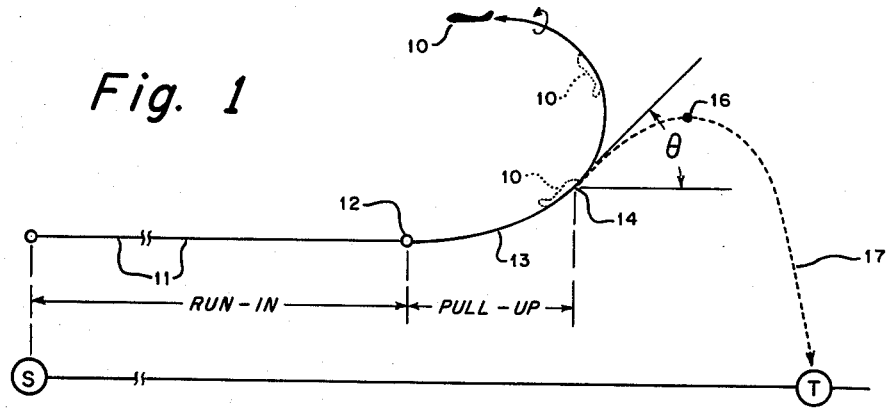

Nov. 23, 1965        P. G. HOLT ETAL        3,218,928
                     LOFT-BOMBING SYSTEM
Original Filed May 29, 1961                6 Sheets-Sheet 1

INVENTORS
PLINY G. HOLT
LOUIS S. GUARINO
BY

Nov. 23, 1965   P. G. HOLT ETAL   3,218,928
LOFT-BOMBING SYSTEM
Original Filed May 29, 1961   6 Sheets-Sheet 2

INVENTORS
PLINY G. HOLT
LOUIS S. GUARINO

Nov. 23, 1965     P. G. HOLT ETAL     3,218,928
LOFT-BOMBING SYSTEM
Original Filed May 29, 1961     6 Sheets-Sheet 3
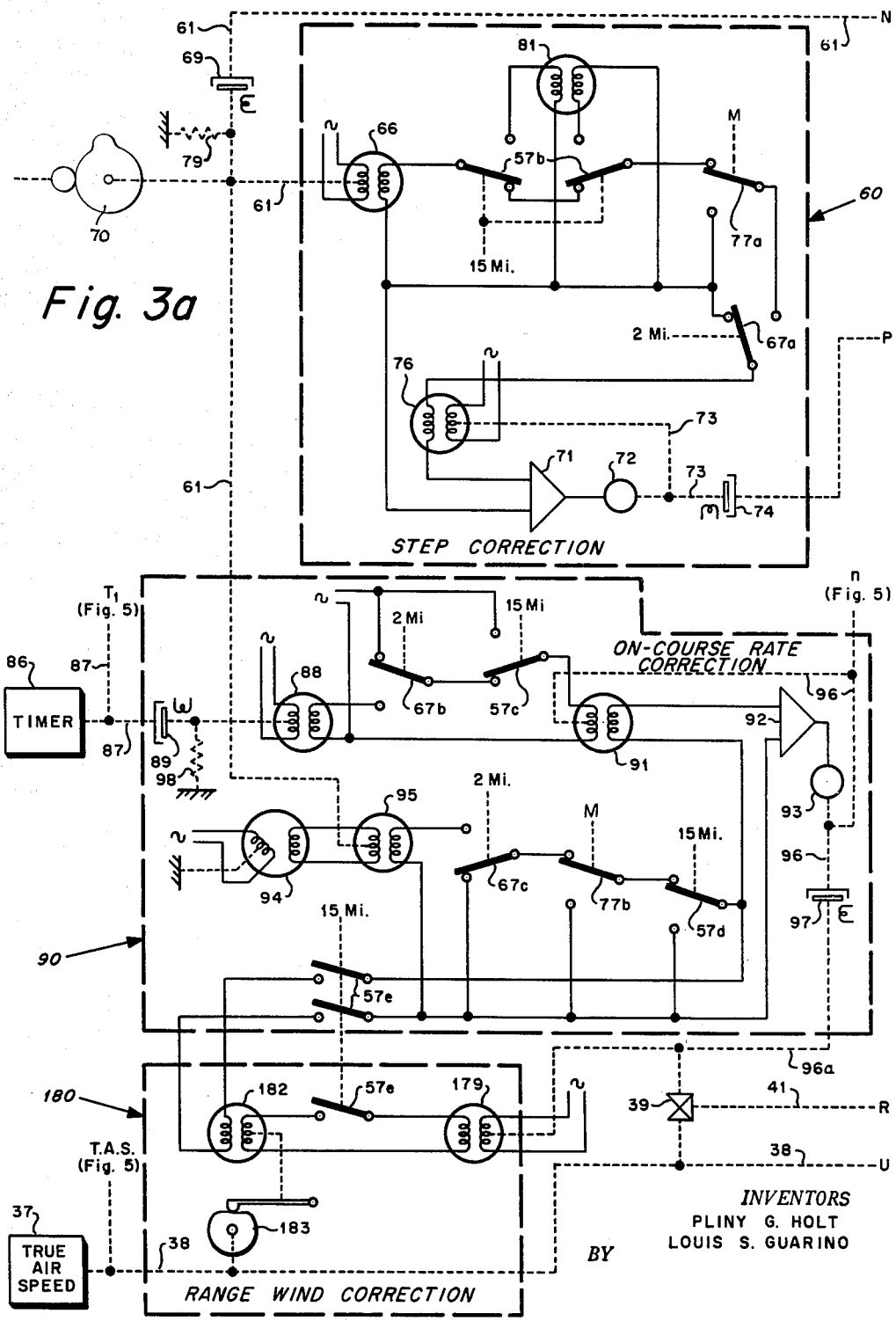
INVENTORS
PLINY G. HOLT
LOUIS S. GUARINO Nov. 23, 1965     P. G. HOLT ETAL     3,218,928
LOFT-BOMBING SYSTEM
Original Filed May 29, 1961     6 Sheets-Sheet 4

INVENTORS
PLINY G. HOLT
LOUIS S. GUARINO
BY

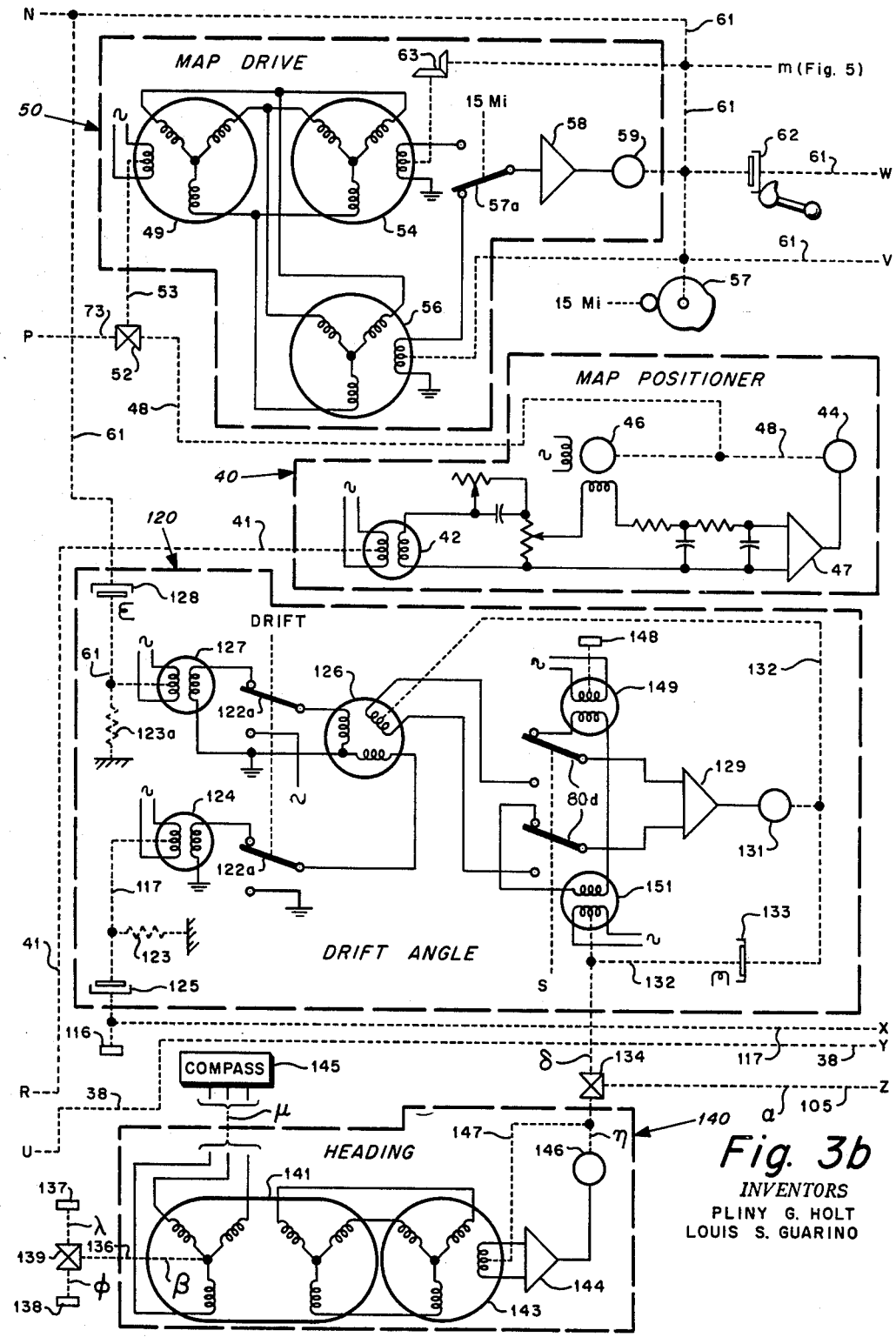

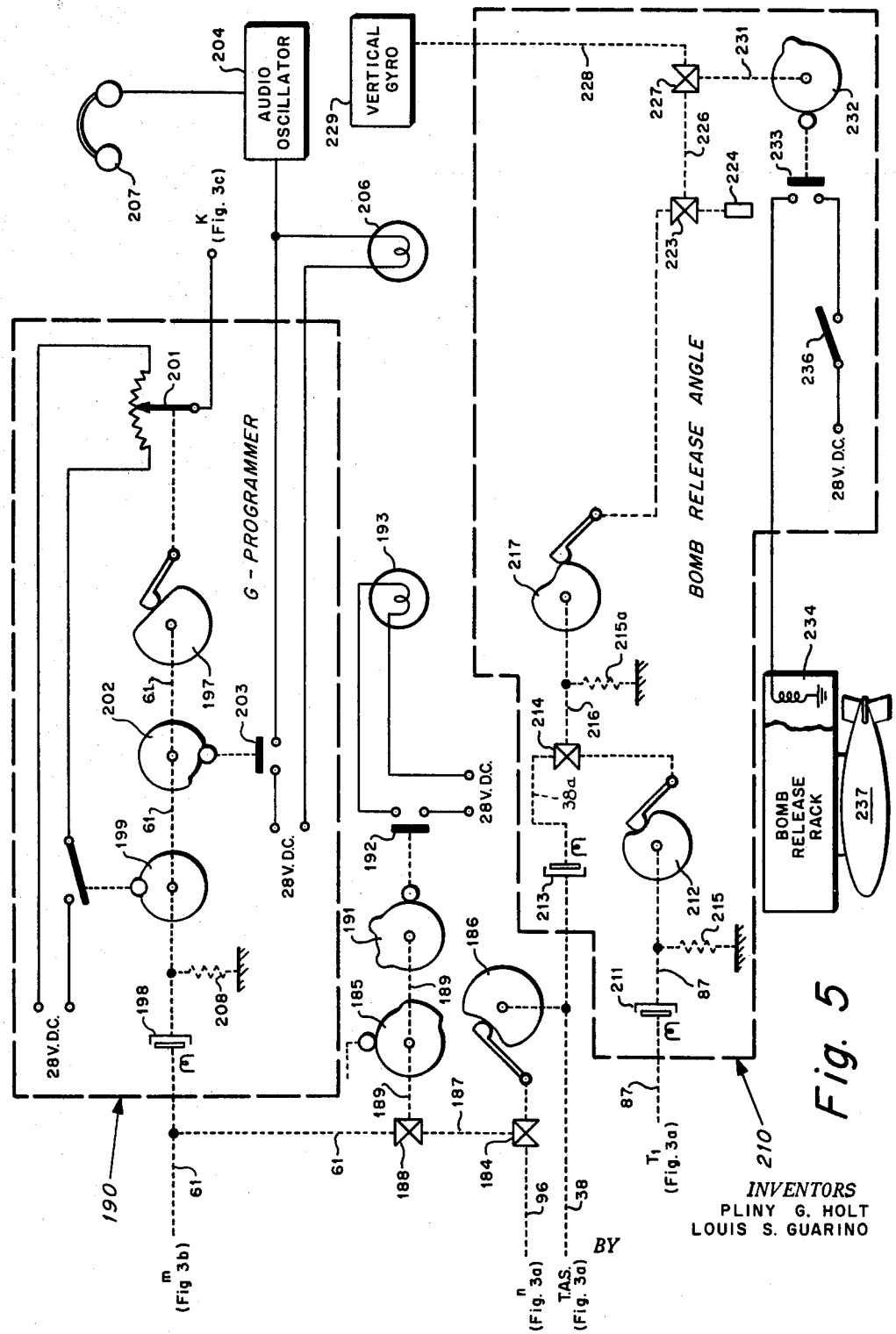

United States Patent Office

3,218,928
Patented Nov. 23, 1965

3,218,928
LOFT-BOMBING SYSTEM
Pliny G. Holt, Bethesda, Md., and Louis S. Guarino, Hatboro, Pa., assignors to the United States of America as represented by the Secretary of the Navy
Original application May 29, 1961, Ser. No. 113,556, now Patent No. 3,136,595, dated June 9, 1964. Divided and this application Dec. 20, 1963, Ser. No. 332,314
7 Claims. (Cl. 89—1.5)
(Granted under Title 35, U.S. Code (1952), sec. 266)

The invention described herein may be manufactured and used by or for the Government of the United States of America for governmental purposes without the payment of any royalties thereon or therefor.

This application is a division of application Serial No. 113,556 for Loft-Bombing System by Pliny G. Holt et al. filed May 29, 1961, now U.S. Patent 3,136,595 issued June 9, 1964.

The present invention relates to a method and apparatus for improving the accuracy of low-altitude loft-bombing techniques, and more particularly to apparatus for providing navigational assistance to the pilot of a high performance aircraft while approaching a bombing target at a low altitude, for providing aircraft maneuvering and pull-up guidance to the pilot before release of a bomb, and for providing automatic release of the bomb to produce precise delivery of the bomb above or on a selected target.

Military requirements for effecting an aerial bombing mission, especially where nuclear weapons are involved, demand that the missile be delivered at the target with sufficient accuracy to accomplish the mission, that an adequate margin of safety from the effects of the weapon blast be provided for the aircraft, and that the element of surprise to the enemy be maintained. Loft-bombing was developed as one technique for fulfilling these requirements. The loft-bombing technique begins with the aircraft on a horizontal approach or run-in toward the target at tree-top level to avoid detection by enemy radar. At some discrete distance from the target, the pilot applies full throttle and pulls back on the control stick thereby pulling the nose of the aircraft up from level flight. This maneuver is called pull-up. When the aircraft longitudinal axis forms a predetermined angle with the horizontal plane, the bomb is manually or automatically released. The momentum and attitude of the bomb at release causes the bomb to begin its trajectory upward, and then descend.

One such known loft-bombing technique is partially mechanized in an attempt to reduce the demands on pilot participation and to increase the effectiveness of a loft-bombing mission. On the way to the target, the pilot must recognize a landmark known as the "initial point," or IP, which is of known geographical location with respect to the target. Based on certain assumed flight parameters for the run-in and pull-up maneuvers, a bombing problem computed prior to the mission begins at the IP. So that the actual flight parameters are consistent with those assumed for the problem, the pilot must position his aircraft over the IP at a fixed velocity and course. Upon crossing the IP, the pilot starts a timer which measures a precomputed time interval representing run-in distance from the IP to a precomputed pull-up point. At the end of the time interval, a command signal is presented to the pilot to maneuver the aircraft in a half Cuban eight. At the beginning of the pull-up portion of this maneuver, there is an increase of centripetal acceleration or $g$-loading along the aircraft Z-axis from the 1-$g$ present at horizontal flight to 4-$g$'s in about two seconds. The $g$-level transition is made linear depending upon the best estimate of the pilot as he executes pull-up. After the two-second period, the pilot holds the centripetal acceleration at 4-$g$'s until the aircraft completes a little more than one-half of the loop and then the pilot begins aircraft roll-out. During the pull-up portion, when the aircraft's pitch angle corresponds with a preselected angle, the bomb is automatically released.

The requirements essential for a successful mission utilizing such a loft-bombing technique are numerous. First, there is an extremely high dependence placed upon the accuracy of navigation after positive recognition of the IP. Failure to recognize the IP will result in an aborted mission or in an over-the-shoulder delivery as a last resort. Second, the positioning of a high-performance aircraft flying at low altitude over a fixed point, on a fixed course, and at a fixed high speed requires great skill of the pilot. Third, a constant, high speed run-in to the target must be maintained. Fourth, the rate of the transition of $g$-loading in the two-second period must be consistent with the precomputed estimates. And fifth, no accumulated errors during the entire bombing maneuver are permissible because the preset bomb release angle commits the pilot in advance to the assumed flight parameters. Restated briefly, the known loft-bombing techniques allowed for no deviation from the severe requirements in flight conditions dictated by those assumed in the precomputed bombing problem.

Accordingly, it is an object of the present invention to provide apparatus for increasing the reliability and accuracy of the loft-bombing technique but at the same time lessen the demands on pilot judgment, with which variations in the pertinent flight parameters can be compensated for prior to and during the run-in maneuver of the loft-bombing mission, with which the point of start of pull-up following the run-in is automatically computed from the pertinent flight conditions existing during run-in, with which the angle of bomb release during pull-up is automatically computed during the pull-up, and with which the transverse acceleration transition during pull-up, is programmed based on an on-course distance.

It is another object of the present invention to provide a navigational aid to the pilot in which the instantaneous position of the aircraft is displayed in the cockpit by a cursor and a map each moving in proportion to a computed ground speed and in which synchronization of cursor and map motion can be corrected at preselected ground check points having corresponding marks on the map.

Still another object of the present invention is to provide apparatus for the computation of guidance information and presentation thereof to the pilot for steering the aircraft to desired destination and for orienting the aircraft into a prescribed attitude for pull-up.

And still another object of the present invention is to provide apparatus for low-altitude loft-bombing which employs a visual dead-reckoning type strip-map display of an approach corridor leading to a target and has navigational capabilities, with which the display continuously presents a computed ground position of an aircraft, with which the computed ground position accuracy is refined by computed displacement and rate corrections, with which reliability of loft-bombing is further enhanced by the presentation of a computed steering angle dictating the change in aircraft heading required to direct the aircraft ground track toward the target, and with which the computations to effect these presentations requires inputs from true airspeed, magnetic compass heading, and map display synchronization by the pilot at two or more preselected ground check points also shown on the map.

A further object of the present invention is to lessen the demand for pilot acuity by providing apparatus permitting a relatively wide latitude of deviation in approach to the target, with which navigational aid during approach to the target is improved, with which pull-up point varies in accordance with variations in certain flight conditions during the approach, with which the transverse acceleration schedule is programmed during the pull-up, with which visible and audible warning signals are presented to the pilot for executing aircraft maneuvers, and in which the bomb release angle varies in accordance with ballistic computations.

Various other objects and advantages will appear from the following description of one embodiment of the invention, and the most novel features will be particularly pointed out hereinafter in connection with the appended claims.

Figure 4:
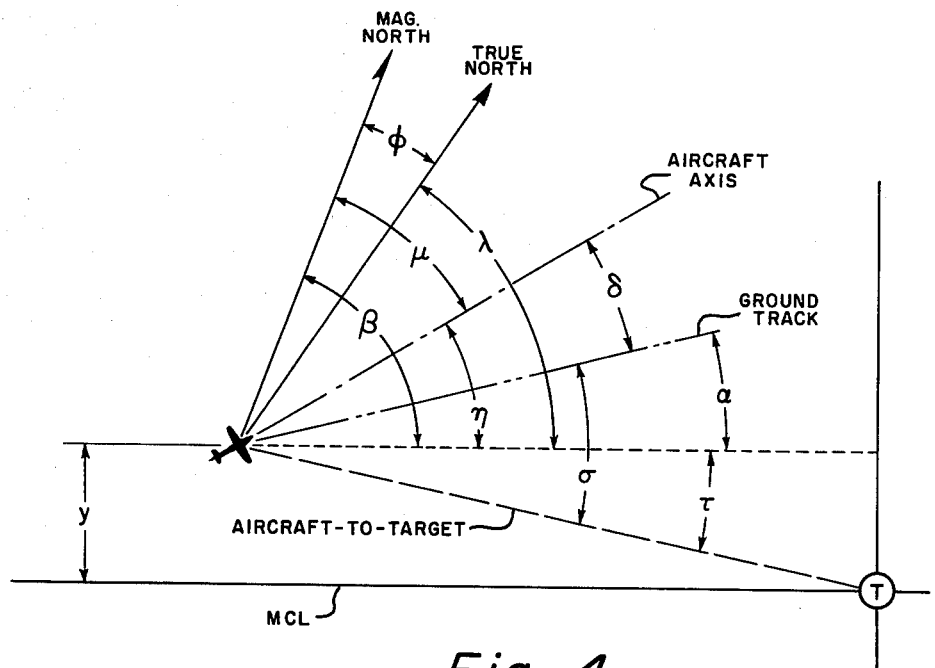
Figure 2:
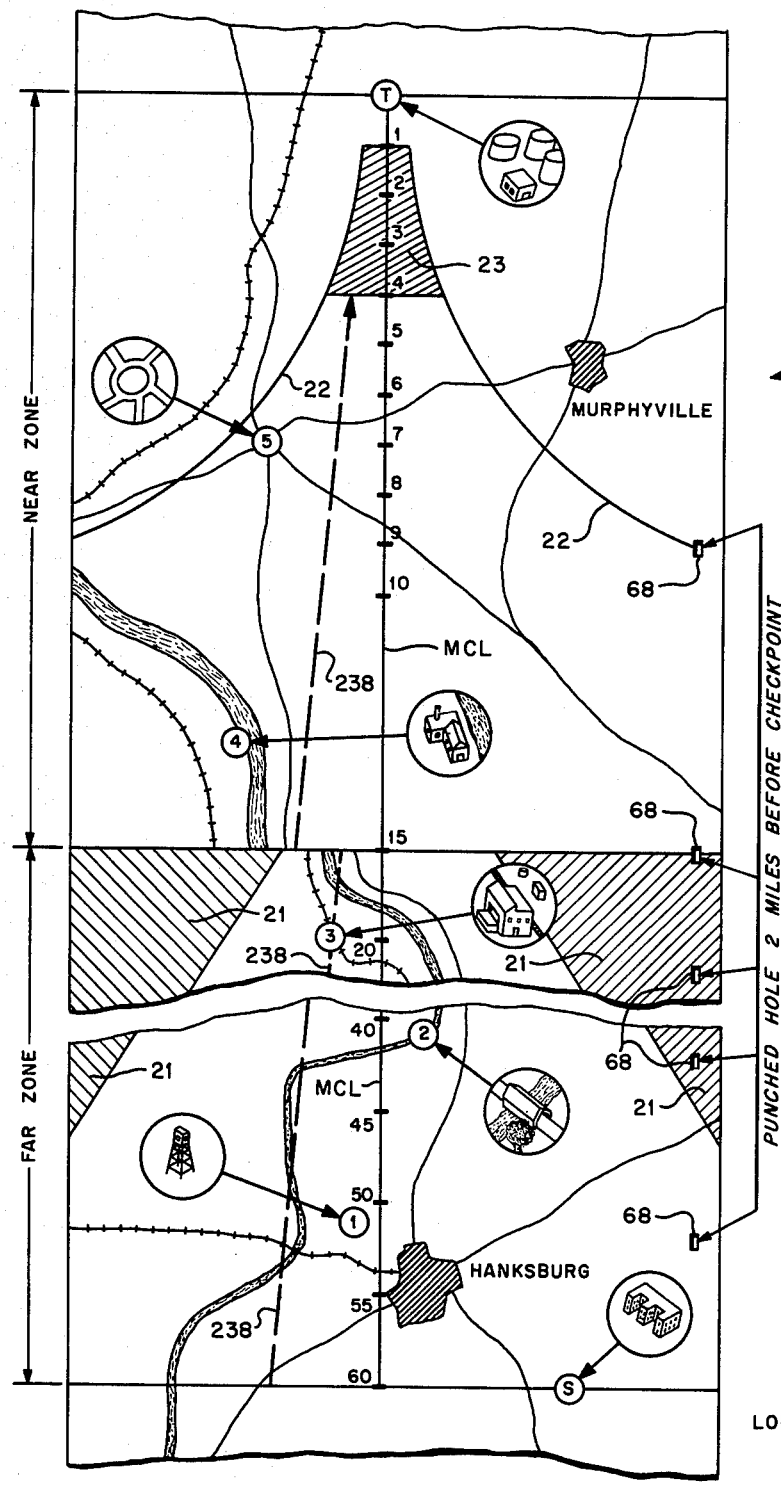
Figure 3C:
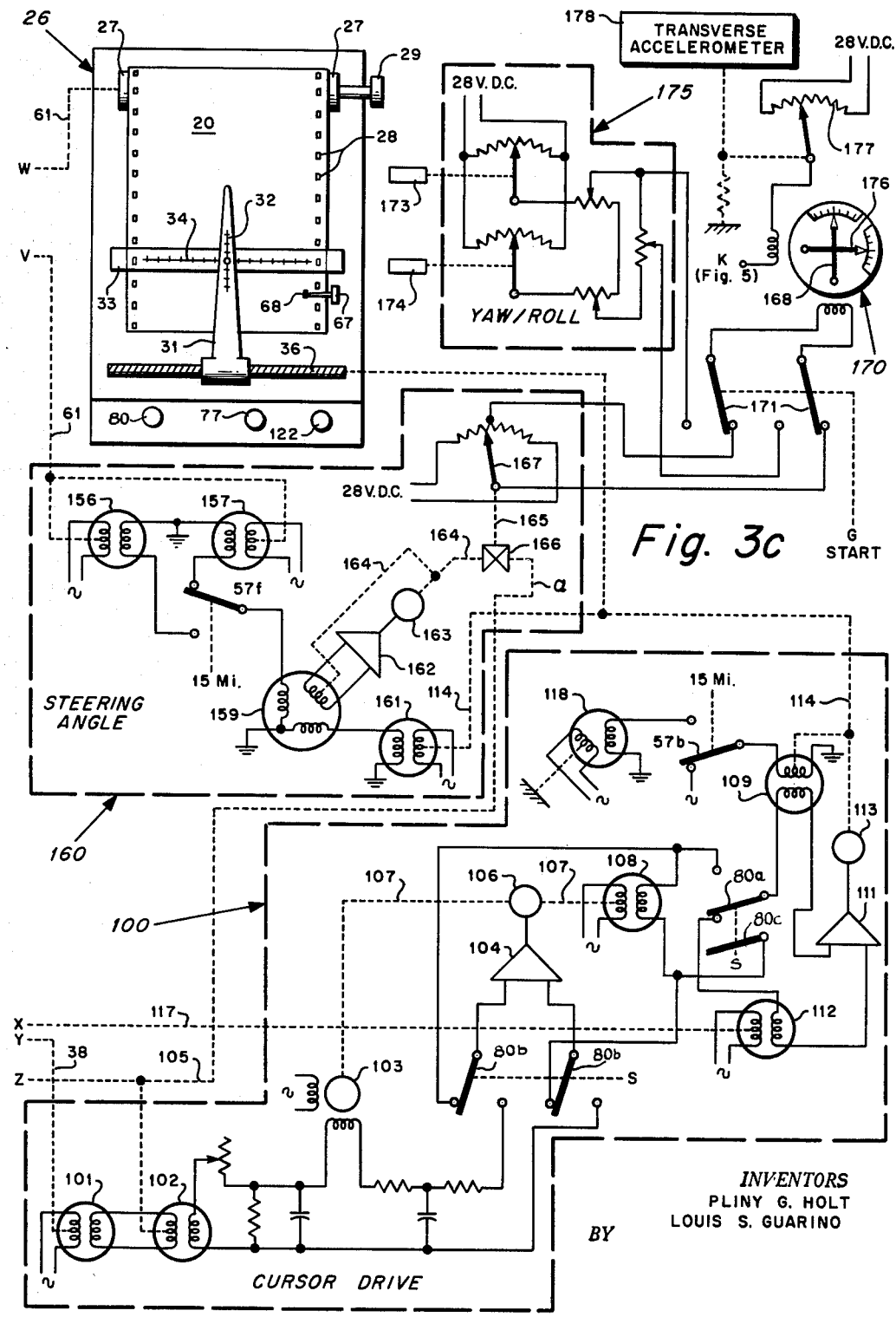

In the drawings:

FIG. 1 diagrammatically represents profiles of the flight path of an aircraft and the trajectory of a bomb released from the aircraft on a low-altitude loft-bombing mission;

FIG. 2 represents a strip map of the present invention which depicts a typical approach corridor leading to a target of a loft-bombing mission;

FIGS. 3a, 3b, and 3c schematically represent an approach computer and navigational display of the present invention;

FIG. 4 diagrammatically represents a top plan view of an aircraft on a low-altitude loft-bombing mission; and FIG. 5 schematically represents a ballistic computer of the present invention.

In the illustrated embodiment of the invention, a low-altitude loft-bombing mission is best described with particular reference to FIG. 1. An aircraft 10 approaches the target T from the left beginning on a horizontal run in path 11 when it crosses the start point S. The aircraft 10 is maintained at a relatively low altitude to avoid the possibility of detection by enemy radar until reaching a pull-up point 12. The aircraft 10 then takes an inside-looped pull-up path 13 during which the aircraft 10 experiences a transition in centripetal acceleration along its vertical or Z-axis from 1–g in horizontal flight to a predetermined higher level. The change in acceleration is programmed against distance to the target T, and when the aircraft 10 attains a computed upward pitch angle $\theta$ such as at the point 14 on the pull-up path 13, a bomb is released. After bomb release, the aircraft 10 continues on the inside loop maneuver and then half-rolling, to direct the aircraft 10 in an upright attitude in the general direction of the start point S. The bomb, being in free flight from the release point 14, is lofted to an apogee 16 and then it descends toward the target T along the trajectory 17.

Several important factors affect the trajectory 17 in a loft-bombing mission. One factor is run-in speed. For example, for a constant pull-up point 12, an excessive run-in speed will cause a lofted bomb to overshoot the target T while a lower run-in speed may cause the bomb to strike short of the target T. The present invention contemplates compensation for different run-in speeds by varying the position of the pull-up point along the run-in path 11.

Another factor is wind. In the consideration of wind, it is convenient to resolve its velocity vector into components parallel and normal to the length of the approach corroidor and hereinafter referred to as range wind and cross wind, respectively. Each has the effect of decreasing bombing accuracy but in different ways. Range wind has the effect of distorting both the pull-up path 13 and the trajectory 17 from what it is in still air. The distortion for a range wind in the same direction as the flight, or a tail wind, is elongation, while a head wind produces compression. The present invention further contemplates compensation for such distortions by shifting the pull-up point 12 farther from or nearer to the target T.

Still another factor affecting the trajectory 17 is weight. During pull-up, a heavy aircraft moves in a tighter loop and fall-off of velocity is relatively fast. The aircraft 10 would also be farther from the target T when the release point 14 is reached. Hence, the release angle $\theta$ should be decreased for a heavier aircraft to extend the range of the trajectory 17. On the other hand, a light airplane moves in a looser loop and would have a higher velocity at the release point 14 since the velocity fall-off would not be as great. The aircraft 10 would also be closer to the target T when the release point 14 is reached. Hence, the angle of release $\theta$ at the release point 14 should be increased for lighter aircraft to shorten the range of the trajectory 17.

Available thrust at the pull-up point 14 is another factor which affects the trajectory 17. Because of the decrease in thermodynamic efficiency of an aircraft engine on a hot day, less thrust would be available during the pull-up maneuver. The effect of lower atmospheric pressure on the trajectory 17 is comparable to the effect of higher temperature. Hence a tighter loop, less advance down range, and a greater fall-off in velocity results. The added drag resulting from the increased angle of attack necessitated by a lower atmospheric pressure also lowers the net thrust available. To compensate for the change in thrust, modification of the release angle $\theta$ accordingly is contemplated.

Finally, there is the factor of run-in altitude. For example, a higher altitude will produce an overshoot of the bomb relative to the target T. Thus, for higher altitudes, shifting of the pull-up point 12 farther from the target T is contemplate.

The strip map indicated generally by the numeral 20 in FIG. 2 represents an aerial view of a typical loft-bombin approach corridor from the start point S to the target T. For purposes of explanation only, and without limiting the invention to any specific example, the total length of the corridor defined between the start point S and the target T is arbitrarily shown as 60 miles. A mean course line, hereinafter identified as the MCL, drawn end-to-end and through the center of the corridor is an arbitrarily selected azimuth coinciding with the desired direction of approach to the target but about which the aircraft 10 may deviate within the lateral limits of the strip map 20. The 60-mile approach corridor shown in the map 20 is divided along its length into two zones, namely, the FAR ZONE and the NEAR ZONE. The FAR ZONE begins at the start point S 60 miles from the target T and extends to a distance 15 miles from the target T, then the NEAR ZONE continues to the target T. The map scale or reduction in map size in the FAR ZONE is arbitrarily chosen in this embodiment as three times the scale or reduction in map size in the NEAR ZONE.

The map 20 is prepared prior to a loft-bombing mission from intelligence information gathered on the area surrounding the target T. There may be several maps prepared and loaded in individual cartridges for use in the invention to cover the eventuality of an alternate approach to the target T or even of an alternate target. On a mission, the pilot may carry several map cartridges from which a selection can be made momentarily according to the tactical situation encountered.

The target T in the illustrated example is a cluster of storage tanks as shown by the inset circular picture pointed toward the target T. Principal towns, major highways, railroads and rivers are plotted on the map 20 with many minor features and landmarks omitted to avoid cluttering and to facilitate rapid reading by the pilot.

Numerous check points identified by the circled numbers 1, 2, 3, 4 and 5 are interspersed along the approach corridor to be used for navigation and ballistic computations. Accompanying each check point is an inset circular picture of an object serving as a precise point of reference in the approach corridor. The object at each check point is selected for its easily recognizable features and has a known position with respect to the target T.

The map 20 contains several additional visual aids for the pilot. Beside principal terrain and geographical features, there are tick marks along the MCL designating on-course distances to the target T. Beginning around the 45-mile tick mark, there is a shaded area 21 on each side of the map 20 to warn the pilot of a pending change of map scale and a narrowing of the approach corridor. It is necessary for the pilot to navigate the aircraft 10 between the shaded areas 21 by the time that the 15-mile tick mark is reached when the map 20 changes scale. In the NEAR ZONE there are two curved lines 22 symmetrical about the MCL and beginning at opposite sides of the map 20 about 9 miles from the target T. The curved lines 22 form a funnel-like area narrowing toward a pull-up region 23, shown shaded. The curved lines 22 represent limits from which the pilot can still maneuver the aircraft 10 into position for pull-up by executing two standard rate turns, i.e. the rate of change in heading need not exceed 3 degrees per second. The pull-up region 23 represents the on-course limits for ballistic computations and lateral tolerances. The size of the pull-up region 23 is indicative of the degree of flexibility provided by the invention for the execution of a loft-bombing mission.

The map 20 is displayed in the aircraft 10 on a cartridge insertable in a display unit 26, as shown in FIG. 3c, and is transported by a sprocket roller 27 in a direction parallel to the MCL. The map 20 has punched holes 28 spaced along each side for engaging spurs in the sprocket roller 27. A roller knob 29 fixed at one end of the roller 27 provides manual slewing of the map 20 to any desired position along the MCL. It is contemplated that map slewing may also be accomplished electrically by additional push buttons and electrical relays.

A transparent cursor 31 in the display unit 26 provides a continuous indication of the lateral position of the aircraft 10 in the approach corridor. The cursor 31 has a vertical index 32 inscribed thereon with tick marks spaced at intervals corresponding to each of the scales of the map 20. A transparent bar 33 fixed against motion on the display unit 26 in front of the map 20 has a horizontal index 34 inscribed thereon with appropriately spaced tick marks. The point on the map 20 under the intersection of the vertical and horizontal indices 32 and 34 is a computed instantaneous map position. The cursor 31 is driven laterally by means of a worm gear 36 which is rotatably supported at its ends in the display unit 26 by means not shown.

NAVIGATION COMPUTATIONS

The point on the map which appears at the intersection of the vertical and horizontal indices of the display unit 26 is determined by navigational computations which may be categorized generally as on-course and cross-course computations. The on-course computation determines the position of the map along the MCL with respect to the horizontal index 34. The cross-course computation determines the position of the cursor 31 along the horizontal index 34 relative to the MCL.

On-course map drive

The on-course computation mainly consists of an integration of true airspeed TAS which yields an on-course distance measured from the start point S. The TAS input is derived from a transducer 37, such as a pitot tube having its pressures transformed into an angular position on a shaft 38. The shaft 38 is connected to one input of a mechanical differential 39. If the other input to the differential 39 is locked, the output shaft 41 is also proportional to the TAS and positions the rotor of a linear transformer 42 in a map positioner unit 40. A linear transformer, as used herein, has the characteristic of generating an output voltage whose magnitude is a linear function of an input shaft position. The output voltage of transformer 42 is connected to an on-course integrator comprising a combination of a motor 44, a generator 46 and an amplifier 47. The other input of the differential 39 being locked, the position of a shaft 48 between the motor 44 and the generator 46 is a time integral of the TAS. The shaft 48 also connects to the rotor of a synchro transmitter 49 of a map drive unit 50 through one input of a mechanical differential 52 and a differential output shaft 53. Depending upon the position of a scale change switch 57a operated by a cam 57 driven by the shaft 61 when the map 20 indicates the aircraft position is 15 miles from the target T, either a FAR ZONE synchro receiver 56 or a NEAR ZONE synchro receiver 54 will supply a voltage to an amplifier 58 to drive a map drive motor 59. An output shaft 61 of the motor 59 is selectively connected to the sprocket roller 27 in the map display unit 26 through a clutch 62 which is engaged when the map 20 is inserted. The shaft 61 is also coupled to the rotors of the receivers 54 and 56 thus providing a continuous follow-up of map position through the receiver 54 or 56 as determined by the switch 57a. The coupling between the rotor of the receiver 54 and the shaft 61 includes gears 63, so that the map drive rotor 61 is required to drive through three times the angular displacement of the shaft 53 in order to follow-up a given increment of error voltage at the amplifier 58. This corresponds to the map scale change.

Due to the presence of a range wind, an error will accumulate between the actual ground position of the aircraft 10 and the position indicated on the map 20 inasmuch as TAS measurement is not a measurement of ground speed of the aircraft. In order to align the map position with aircraft position relative to the ground and synchronize the map drive speed with aircraft ground speed, several adjustments are necessary to the shaft 53 at the input of synchro transmitter 49 of the map drive unit 50. One is modification of the shaft 48 at the output of the map positioner unit 40 in the form of a step correction. The step correction periodically repositions the map 20 so that a point under the horizontal index 34 corresponds with the actual position of the aircraft over the ground in the approach corridor. Another is a modification of the shaft 38 at the input of the map positioner unit 40 in the form of a rate correction.

On-course step correction

Step correction is a periodic skipping of the map 20 either in the forward or reverse direction. This occurs at any time there is a lack of agreement between the position of one of the check points 1, 2, 3 4 or 5 relative to the horizontal index 34 and the location of a corresponding object on the ground at the time the pilot makes a visual comparison and effectuates synchronization. A step correction unit 60, operating independently of rate correction, and in both the NEAR and FAR ZONES, restores alignment. At an on-course distance of two miles before and after each check point called the enabling zone, an electrical enabling switch 67 fixed on the display unit 26 operates. The switch 67 has two opposing contacts held apart because they extend on the opposite surfaces of the map 20. Corresponding to precisely 2 miles before each check point 1, 2, 3, 4 and 5 on the map 20, there is a hole 68 laterally aligned with the contacts of the enabling switch 67. When the map 20 moves so that one of the holes 68 is between the contacts of the enabling switch 67, the contacts close and cause a solenoid operated clutch 69 to engage thereby causing the rotation of the map drive output shaft 61 to be transmitted to the rotor of a linear transformer 66. By appropriate relays, contact 67a also moves from the position illustrated to connect transformer 66 in series with a linear transformer 70 and an amplifier 71. As map drive progresses, an output voltage of the transformer 66 appearing at the amplifier 71 and representing a distance error, decreases from a preset level at the step correction enabling position (2 miles before the check point) to zero at the check point and then increases in the opposite direction to the same level at the step correction disabling position (2 miles after the check point). A motor 72 driven by the amplifier 71 has its output shaft 73 selectively connected to another input of the mechanical differential 52 through a solenoid operated clutch 74. Positive positioning of the motor 72 is accomplished by follow-up of the linear transformer 76. The clutch 74 is disengaged while the distance error is accumulating on the output shaft 73. The pilot depresses a MARK button 77 located on the display unit 26 when he observes that the aircraft 10 is abreast of a check point. By an electrical circuit, not shown, a contact 77a in the step correction unit 60 moves from the position illustrated to connect the transformer 76 as the sole input to the amplifier 71, and the motor 72 will drive until the transformer 76 has been restored to its position at the start of step correction. The MARK button 77 also causes clutch 74 to engage so that the restoring rotation appearing on the shaft 73 is transmitted to the other input of the mechanical differential 52. The input on shaft 48 to the differential 52 is thus periodically corrected by the increment of rotation entered through the shaft 73. Depressing the MARK button 77 also disengages the clutch 69 previously engaged by the switch 67. Cam switch 70 will disengage the clutch 69 at the end of the enabling zone if the MARK button 77 is depressed at a check point. A fly-back spring 79 restores the rotor of transformer 66 to the step correction enabling position.

Summarizing step correction, when the aircraft 10 comes abreast of each preselected check point the MARK button 77 is depressed. If, at that instant, the on-course component of the map position does not agree with that of the geographical position of the aircraft 10, that is, if the corresponding check point on the map is not under the horizontal index 34, the map will skip due to the restoring motion on the shaft 73 an amount sufficient to align the map with the geography. It should be noted that failure to depress the MARK button 77 within the enabling zone will not be harmful to the accuracy of the existing map alignment. Tracking will continue in accordance with the corrected information accumulated up to the previous check point.

Step correction can be made in both the NEAR and FAR ZONES. A locked-rotor linear transformer 81 in the step correction unit 64 having a voltage transformation ratio corresponding to the change in map scale is selectively connected in the circuit with transformer 66 by contacts 57b which are operated at 15 miles from the target T by the cam 57.

ON-COURSE RATE CORRECTION

On-course rate correction refers to the difference or error between the map drive rate and the actual aircraft ground speed. So that the drive rate is accurately synchronized with the ground speed of the aircraft 10 is accomplished, before the aircraft 10 reaches the NEAR zone, this error must be taken into account. In effect, the on-course rate error, prior to any correction, is the difference between the true airspeed TAS and ground speed. This difference or on-course rate error is added through the other input of the mechanical differential 39 to modify the TAS signal on shaft 38 whereby the position of the output shaft 41 is a corrected TAS corresponding to the on-course ground speed. The on-course rate correction is computed within the enabling zone by an on-course rate correction unit 90.

To obtain the correction rate, an increment of map transport distance is divided by the time from start point S. A timer 86 produces a position on a shaft 87 which is a function of time from the start point S. The shaft 87 drives the rotor of a linear transformer 88 through a solenoid operated clutch 89. Clutch 89 is engaged at the start of the run-in when a START button 80 is depressed. At the beginning of the enabling zone (2 miles before each check point in the FAR ZONE) when the enabling switch 67 engages the clutch 69, map motion is transmitted through the output shaft 61 to the rotor of a linear transformer 95. Within the enabling zone a contact 67b, operated by the enabling switch 67, connects the electrical output of the linear transformer 88 to the rotor coil of a linear transformer 91. The fixed coil of the transformer 91 is connected in series with a contact 67c, operated by the enabling switch 67, to the fixed coil of the transformer 95, and an amplifier 92. The resulting voltage at the amplifier 92 is proportional to the quotient of the electrical signals developed by transformers 88 and 95. Appropriate scale factoring is provided by the locked rotor of the linear transformer 94 which has its electrical output connected to the rotor coil of transformer 95. A motor 93 is driven by the amplifier 92 accordingly positioning an output shaft 96. Follow-up for the shaft 96 is provided by its connection to the rotor of the transformer 91. The angular position of the shaft 96 at any instant within the enabling zone is representative of the instantaneous rate error which is the negative of the amount that would be necessary to correct the map drive rate; and when the pilot depresses the MARK button 77 in an enabling zone, a contact 77b disconnects transformer 95 and leaves transformer 91 as the sole input to the amplifier 92. Simultaneously, a solenoid-operated clutch 97 engages the shaft 96 to the other input of the differential 39 through a shaft 96a. As the motor 93 restores the rotor of transformer 91 back to the null position, the restoring rotation of the shaft 96 is transmitted through the clutch 97 to the differential 39 where it modifies the TAS input on the shaft 38 as appears on the shaft 41 to the map positioner unit 40. In a manner described above, clutch 69 disengages at the end of the enabling zone, and the fly-back spring 79 restores the rotor of transformer 95 to its initial position. Similarly, at the end of a loft-bombing mission the clutch 89 disengages and a fly-back spring 98 restores the rotor of transformer 88 to its initial position.

It will be noted that on-course rate correction is provided for only within the FAR ZONE, whereas step correction is accounted for in both the NEAR and FAR ZONES.

Cross-course cursor drive

To facilitate an understanding of the angles related to cross-course navigation, particular reference will be made to FIG. 4. A medial line identified as a mean course line or MCL on the map 20 corresponds to a magnetic rhumb line extending end-to-end along the approach corridor to the target T. Due to the presence of the cross-course component of wind and due to the probable lateral displacement of the aircraft 10 from the MCL, various angles can be defined. For a lateral displacement $y$, a target angle $\tau$ is formed by an aircraft-to-target line and the MCL. Assuming a cross wind component from the left side of the approach corridor, or downward in FIG. 4, the aircraft 10 must take a port heading. The angle $\eta$ formed by the longitudinal axis of the aircraft 10 and the MCL is the aircraft heading relative to the MCL. The path of the aircraft 10 actually taken over the ground is called the ground track and defines a course angle $\alpha$ with the MCL. The difference between the heading angle $\eta$ and the course angle $\alpha$ is a drift angle $\delta$ and the angle formed by the ground track and the aircraft-to-target line is the steering angle $\sigma$.

The distance the aircraft 10 is from the target T along the aircraft-to-target line is the actual distance-to-go. For small target angles $\tau$, the actual distance-to-go is substantially equal to the on-course distance-to-go as measured along the MCL.

The cross-course cursor 31 position is the result of integration of a cross-course component of the ground speed from an initial lateral position of the lateral cursor 31 to a subsequent lateral position. The initial position is considered as a constant of integration for the purpose of computation. The product of the TAS and the course angle α is further considered to be a close approximation of the cross-course component of ground speed because, for small course angles α, the sine of α is substantially equal to the angle α in radians. Inasmuch as navigation within the approach corridor usually involves course angles α which are less than 15 degrees, this approximation of the sine can be made without significant loss in accuracy.

The cursor 31 in the display unit 26 continuously tracks the lateral position of the aircraft 10 by means of a cursor drive unit 100 (FIG. 3c). True airspeed TAS, appearing as an angular position on shaft 38 is connected to the rotor of a linear transformer 101. The output voltage excites the rotor coil of a linear transformer 102 which has its rotor positioned by a shaft 105 which is angularly positioned as a function of the course angle α. The manner in which the course angle α is obtained on the shaft 105 will be described below in connection with drift correction. The output voltage developed in the fixed coil of the transformer 102 thus becomes the product of TAS and the course angle α which is substantially the cross-course component of ground speed. This voltage is fed to the cross-course integrator which includes a generator 103, an amplifier 104, and a motor 106. An output shaft 107 of the motor 106 is positioned as a function of a time integral of the cross-course ground speed, namely, the cross-course distance. The position of shaft 107 is then transformed into an electrical voltage by means of a linear transformer 108. The output voltage of the transformer 108 is connected through contacts 88a and 80c in series with linear transformers 109 and 112 across an amplifier 111 when the START button 80 is depressed. The amplifier 111 drives a cursor drive motor 113 which is drivingly connected to the worm gear 36 by an output shaft 114. The shaft 114 is also coupled to the rotor of the linear transformer 109 for follow-up action. The motor 113 continues to drive until the change in output voltage of the transformer 109 is equal and opposite to the change in output voltage of the transformer 108. The position of the shaft 114 is therefore representative of the cross-course distance traveled during the integration. Another pair of contacts 80b, operated by the START button 80, are maintained in the position illustrated until the aircraft 10 is abreast of the start point S. This is so that cursor 31 can be placed at a given initial lateral displacement from the MCL and so maintained until integration is desired.

For establishing the lateral position of the vertical index 32 relative to the map 20 so that it corresponds to the lateral position on the ground throughout the run-in, it is necessary to set the vertical index 32 on a corresponding ground reference point from which the distance integration is started. This is accomplished by the linear transformer 112 which provides for manually setting the initial lateral cursor position, or subsequent lateral positions. From a mathematical standpoint, the setting may be regarded as fixing the constant of integration. Manual setting of the cursor is made at any time by a cursor adjusting knob 116 which turns the rotor of the transformer 112 through a shaft 117. Manual adjustments can also be made prior to depressing the START button 80 whereby contacts 80a and 80b remain in the positions illustrated. Thus, transformers 109 and 112 are the only inputs to the amplifier 111. The position of the shaft 114 therefore corresponds to the lateral position selected on the knob 116. When the aircraft 10 is over the ground reference point, the START button 80 is depressed whereby contacts 80a, 80b and 80c enable rotation of the shaft 114. At 15 miles from the target T, a linear transformer 118 having a locked rotor has the output of its fixed coil connected to the rotor coil of transformer 109. The rotor of transformer 118 is locked in a position which yields a transformation ratio equal to the scale change from the FAR ZONE to the NEAR ZONE.

Drift correction

The course angle α appearing as an angular position on the input shaft 105 of the cursor drive unit is computed by algebraically adding the heading angle η and the drift angle δ. The latter is computed in a drift angle unit 120 by components of a lateral error due to a cross wind and the on-course distance over which the lateral error accumulated. The lateral error, which is the cross-course distance in miles between one point on the map 20 corresponding to the actual ground position of the aircraft 10 and another point on map 20 indicated by the vertical index 32, is manually introduced in the drift angle unit 120 at the knob 116 connected by the shaft 117 and a solenoid operated clutch 125 to the rotor of a linear transformer 124. The positioning of the vertical index 32 is based solely on the best estimate of the pilot. The output voltage of the transformer 124, proportional to the lateral error, is connected to the one stator coil of a resolver 126. The second stator coil of the resolver 126, in quadrature with the first stator coil, is supplied by the output voltage from a linear transformer 127. The angular position of the output shaft 61, representing the on-course distance since the previous lateral check point, is connected to the rotor of the transformer 127 through the solenoid operated clutch 128. The clutches 125 and 128 are engaged by depressing the START button 80 thereby transmitting the angular positioning of shafts 61 and 117 to the transformers 127 and 124, respectively. The resolver 126 has one of its rotor coils (not shown) short circuited, while the other rotor coil is connected to the input of an amplifier 129 which drives a motor 131 when contacts 80d, operated by the button 80, move from the position illustrated to the opposite position. An output shaft 132 of the motor 131 provides a follow-up connection between the rotor of the resolver 126 and the motor 131. The angular position on the shaft 132 therefore is the negative of the drift angle δ whose tangent is the lateral error divided by the on-course distance in which the lateral error was accumulated.

A DRIFT button 122, located on the display unit 26, is depressed when a selected lateral reference is reached. Clutches 125 and 128 disengage allowing fly-back springs 123 and 123a to restore the rotors of the transformers 124 and 127 to their initial or zero position. Contacts 122a then move from the position illustrated to the opposite position allowing the motor 131 to drive the resolver 126 back to its initial or zero position. A normally engaged clutch 133, which disengages when the START button 80 is depressed and permits shaft 132 to be positioned by the inputs of shafts 117 and 61 without affecting a mechanical differential 134, reengages when the DRIFT button 122 is depressed thereby transmitting the restoring rotation of the shaft 132 to one input of the differential 134.

The drift angle unit 120 also includes an option for the pilot to set an estimated cross wind into the system prior to the start of the run-in of a bombing mission. A CROSS WIND knob 148 positions the rotor of a linear transformer 149 having a stator coil of a linear transformer 151, contacts 80d in the position shown, and the amplifier 129 to drive the motor 131. Being normally engaged by the clutch 133 prior to start, the shaft 132 drives the transformer 151 until a voltage has been developed in the stator coil of the transformer 151 which is equal and opposite to the output voltage of the transformer 149. The position of the shaft 132 thus represents the initially estimated cross wind as a drift angle δ, at an assumed on-course TAS. After the START button 80 is depressed, the electrical circuit in the drift angle unit 120 is changed so that manual setting of cross wind is no longer operative. Initially, the transformer 151 is rotated to a position which is representative of the initial cross wind drift angle. Clutch 133 is disengaged when the START button 80 is depressed and is engaged at the completion of the drift computation. It will be noted that successive drift solutions are added to the initial cross wind drift angle existing on the transformer 151 and are stored for future use.

The drift angle $\delta$ at the shaft 132 is combined with an aircraft heading $\eta$ relative to the MCL at the mechanical differential 134. If more than one increment of drift angle has been computed, the correcting quantity at the differential 134 is a summation thereof.

Course angle

A heading unit 140 computes the aircraft heading with respect to the MCL. Map angle $\lambda$ (FIG. 4) with respect to North and local magnetic variation angle $\phi$ at the target T are set into the heading unit 140 by means of adjusting knobs 137 and 138, respectively. The summation of these two quantities takes place in a mechanical differential 139 with its output shaft 136 representing the magnetic azimuth $\beta$ of the MCL. The rotor of a differential generator 141 is coupled to the shaft 136 and is continuously excited by a signal from a magnetic compass 145 in the aircraft 10. The output signal of the generator 141 is the difference between the magnetic heading $\mu$ and the magnetic azimuth $\beta$ of the MCL, or the aircraft heading $\eta$ with respect to the MCL. The heading $\eta$ is then transmitted to a control transformer 143 which has its output voltage connected to an amplifier 144 which in turn drives a motor 146. The shaft 147 of the motor 146 is mechanically coupled to the rotor of the transformer 143 to provide follow-up. Thus, the angular position of the shaft 147 is representative of the aircraft heading $\eta$ with respect to the MCL. For a no-drift condition, this angle $\eta$ is also the course angle $\alpha$. The heading $\eta$ on shaft 147 and the drift angle $\delta$ on shaft 132 are algebraically combined in the differential 134 to produce the course angle $\alpha$ on the shaft 105. As noted previously, the course angle $\alpha$ modifies the TAS signal on shaft 33 in the cursor drive unit 100 to obtain the cross-course speed component for driving the cursor 31.

Steering angle

The above-described mechanisms provide a display on the map 20 of the aircraft 10 instantaneous position relative to ground by the intersection of the horizontal index 34 and the vertical index 32 within the approach corridor to the target T. The line generated by the movement of the instantaneous position is called a ground track. An additional important navigational aid to the pilot is a steering angle $\sigma$ (FIG. 4). The steering angle $\sigma$ enables the pilot to direct the ground track of the aircraft 10 toward the target T, so that the ground track coincides with the aircraft-to-target line. The steering angle $\sigma$ is derived by a steering angle unit 160 using as inputs, the lateral distance $y$ from the MCL, the on-course distance to the target T, and the course angle $\alpha$. The on-course distance to the target T is introduced by displacing the rotor of a NEAR ZONE linear transformer 156 and a FAR ZONE linear transformer 157 an amount equal to the scale distance from the target T to the start point S. This may be accomplished by first inserting the map 20 into the display unit 26 so that the target T lies under the horizontal index 34, engaging the clutch 62, and then slewing or transporting the map 20 manually by the knob 29 until the start point S lies under the horizontal index 34. Because the clutch 62 is engaged, the rotors of the transformers 156 and 157 will rotate by their connection through the shaft 61. This operation stores a distance-to-target in the rotor position of the transformers 156 and 157. As the aircraft approaches the target T along the approach corridor, the map drive motor 59 is continuously reducing the value of the stored distance-to-target. The output voltage of the transformers 156 and 157 are selectively supplied the first stator coil of a resolver 159 through a contact 57f operated by the map scale changing cam 57 at 15 miles from the target T.

The electrical signal applied to the second stator coil, in quadrature with the first, comes from the output of a linear transformer 161 which has its rotor positioned by the shaft 114 from the cursor drive unit 100, and therefore represents the lateral displacement $y$ from the MCL. One rotor coil (not shown) of the resolver 159 is short-circuited, while the other rotor coil supplies a voltage to an amplifier 162 which drives a motor 163. The motor 163 is mechanically coupled to the rotor of the resolver 159 by a shaft 164 for positive-positioning follow-up. The resulting angular position of the output shaft 164 represents a target angle $\tau$ whose tangent is the quotient of the lateral distance $y$ from the MCL divided by the on-course distance to the target T.

The target angle $\tau$ and the course angle $\alpha$ are the inputs to a mechanical differential 166 which algebraically combines the course angle $\alpha$ and the target angle $\tau$, the output on a shaft 165 being the steering angle $\sigma$. If the course angle $\alpha$ equals the target angle $\tau$, in both magnitude and direction, the ground track of the aircraft 10 passes through the target T. If the two angles are not equal, the difference represents an angle which the pilot must apply as a steering correction in order to direct the ground track of the aircraft toward the target T. The steering angle $\sigma$ is converted into an electrical signal by a potentiometer 167 and is displayed to the pilot on a vertical pointer 168 of a cross needle indicator 170. It should be noted that the steering angle $\sigma$ is merely a reference. The pilot may deviate the aircraft 10 laterally along the approach corridor to suit conditions of the bombing mission. Only during the last portion of run-in, that is immediately prior to the pull-up point 12, must the steering angle $\sigma$ be corrected so that the aircraft ground track coincides with the aircraft-to-target line. At one-third of a mile before the pull-up point 12, a G-start selector switch 171 moves from the position illustrated to disconnect the steering angle unit 160 from the indicator 170 and to connect the output from a yaw/roll unit 175. The shaft inputs 173 and 174 to the unit 175 represent yaw and roll signals from gyros in the aircraft 10 and by the arrangement of potentiometers in the unit 175, a combined roll and yaw signal is connected to the indicator 170 to produce deflection of the vertical pointer 168 during pull-up. The indicator 170 also includes a horizontal pointer 176 electrically connected to a potentiometer 177 which is varied by a mechanical output of an accelerometer 178. The accelerometer 178 is responsive to acceleration through the transverse axis or Z-axis of the aircraft 10.

BALLISTICS COMPUTATIONS

The ballistic system of the present invention is principally a mechanical analog computer integrally a part of the navigational computer system, sharing its components and utilizing cams to solve the bombing problem. The navigational system as above-described provides a convenient stepping stone leading to a coordinated ballistic computation system insofar as it provides the necessary parameters for computing a variable pull-up point and a release angle for the bomb in the bombing problem. The availability of these parameters in the navigational system of the present invention allows the solution of the ballistic problem with only small structural additions. For example, navigational computation of the distance-to-target, together with TAS, can determine a variable pull-up point; and a parameter of range wind permits further refinement of the pull-up point.

Prior to reaching the pull-up point 12, a range wind correction and a still air pull-up distance are developed and combined to obtain a pull-up point which will vary in accordance with the input parameters. After the pull-up point 12, the g-level transition in the pull-up maneuver is programmed for the pilot and the bomb release angle is automatically computed in accordance with the errors accumulated from the pull-up point 12 to the release point 14. In this manner, the lofted bomb will be precisely delivered on the target T.

Range wind correction

The range wind correction is a computed distance which serves to correct the still air pull-up distance from the target T. It is the product of the total time anticipated from the pull-up point to impact multiplied by the range wind velocity or the total on-course rate correction accumulated in the FAR ZONE. In computing the range wind correction, it is assumed that the air moves with the same speed and direction at all altitudes.

The total on-course rate correction developed by the unit 90 at its output shaft 96a angularly positions the rotor of a linear transformer 179 of a range wind correction unit 180. The output voltage excites a linear transformer 182 when contacts 57e, operated by the cam 57, close at the beginning of the NEAR ZONE. Since the total time is a function of a particular run-in speed, TAS is used as an input to a total time cam 183. The rotor of the transformer 182 is angularly positioned by the total time cam follower thereby developing a voltage on the fixed coil of the transformer 182 proportional to the product of the total time and the accumulated on-course rate correction. This voltage is impressed across the amplifier 92 and the stator coil of the transformer 91 when the contacts 57e close. The amplifier 92 thus drives the motor 93, shaft 96 and the rotor of the transformer 91 until the latter's output voltage is equal to and opposite that existing on the rotor coil of the transformer 182. The resultant position of the shaft 96 is therefore proportional to a distance which is the range wind correction.

Pull-up point and G-programmer

The shaft 96 is also mechanically coupled to one of the inputs of a mechanical differential 184 (FIG. 5). The other input to the differential 184 is the angular position of the follower of a still air distance cam 186. This shaft position predicts the pull-up distance from the target T for a particular run-in speed under a still air condition. The algebraic sum of the two inputs to the differential 184 is a corrected pull-up distance from the target T for a particular speed and range wind condition and is represented by the angular position of the shaft 187.

The shaft 187 from the differential 184 is connected to one input of a mechanical differential 188 where its position is subtracted from the instantaneous map position represented by the angular position of the shaft 61 connected to another input of the differential 188. The output shaft 189 of the differential 188 therefore represents the remainder or distance to go to pull-up and is used for generating various alerting signals. A cam 191 rotates with the output shaft 189 causing a contact 192 to close momentarily at one mile and at two-thirds of a mile before the pull-up point thereby energizing a green warning light 193 as a visual indication to the pilot of approach to the pull-up point 12. A signal is also initiated by a g-start cam 185 which rotates with the shaft 189 and engages the solenoid operated clutch 198 of a g-programmer unit 190 at the point one-third mile from the pull-up point. As noted previously, switch 171 (FIG. 3c) also moves from the position shown. Shaft 61 now drives a plurality of cams. A switch cam 199 connects a D.C. electrical source to a potentiometer 201. A g-cam 197 rotates with the shaft 61 with its follower connected to the wiper arm of the potentiometer 201 which in turn has its variable output voltage connected to the drive coil of a horizontal pointer 176 in the indicator 170. The potentiometer 201 output is characterized to cause the pointer 176 first to drop, then to rise gradually, and finally to reach a horizontal position at the precise instant of the computed pull-up point 12. This pointer action provides a visible anticipatory signal for pull-up. At the point of pull-up, a cam 202, driven by the shaft 61, closes a contact 203 to connect a D.C. electrical source to an audio oscillator 204 and a pull-up light 206; and the g-programmer cam 197 continues to rotate to drive the pointer 176 according to a desired schedule of transition from one g to four g's transverse acceleration along the Z-axis of the aircraft 10. The output signal from the potentiometer 201 opposes the output signal from the potentiometer 177 at the actuating coil of the pointer 176 thereby presenting an instantaneous g-error signal on the pointer 176. The g-transition schedule is therefore a function of the on-course distance to the target T, and the acceleration program throughout this distance may be varied to meet any tactical condition. For example, an S-shaped pull-up curve or acceleration versus distance curve is preferred in certain high-performance aircraft. When the pilot maneuvers the aircraft 10 so that the transverse acceleration along the aircraft Z-axis matches the output of the potentiometer 201, the pointer 176 remains horizontal, indicating that the proper pull-up maneuver is being executed. Any deviation from the g-program is indicated by a deflection of the pointer 176 which the pilot can correct with the control stick. Ear phones 207 are provided for presenting the audible signal from the oscillator 204 to the pilot. After release of the bomb, the clutch 198 is disengaged and a fly back spring 208 resets the cams in the g-programmer unit 192 in its initial position prior to pull-up.

Bomb release angle

As noted earlier with reference to FIG. 1, the release angle $\theta$ should be varied to correct for errors developed after the computed pull-up point. A bomb release angle unit 210 is provided for computing the variable release angle $\theta$ based on deviations from the predicted fall-off of velocity during the pull-up. At the beginning of pull-up, determined by the pull-up cam 202, solenoid operated clutches 211 and 213 engage. The clutch 211 drivingly connects the timer output shaft 87 to a differential velocity or $\Delta v$ cam 212 whereby it is angularly positioned in proportion to integrated time from the pull-up point. The shape of cam 212 produces follower motion representing the predicted fall-off of aircraft velocity at any instant of time during the pull-up. The clutch 213 drivingly connects the TAS shaft 38 through a shaft 38a to one input of a mechanical differential 214. The position of shaft 38a is not true airspeed, but the actual velocity fall-off; i.e., the difference between true airspeed and the instantaneous value of true airspeed at the computed pull-up point upon closing the clutch 213. The other input to the differential 214 is connected to the follower of the $\Delta v$ cam. The output shaft 216 of the differential 214 therefore is the difference between the predicted velocity fall-off as generated by the cam 212 and the measured velocity fall-off at any instant after the computed pull-up. If the measured velocity fall-off and the predicted velocity fall-off are the same, the output of the differential 214 is zero and no change in the preselected release angle $\theta$ is necessary. However, if they differ, the shaft 216 causes rotation of a $\Delta\theta$ cam 217. The follower of the $\Delta\theta$ cam 217 develops a quantity proportional to a modification in the preselected release angle $\theta$ required to obtain a target hit. The follower motion is transmitted to one input of a mechanical differential 223, the other input being a preselected release angle $\theta$ adjusting knob 224. The output shaft 226 of the differential 223 is drivingly connected to one input of a mechanical differential 227 where it is compared with another input 228 from a vertical gyro 229. The algebraic sum of these inputs appears at the output shaft 231 which rotates a bomb release cam 232. At the precise modified bomb release angle $\theta \pm \Delta\theta$, the cam 232 closes a contact 233 connected in series with a "pickle" switch 236 and an electric mechanism 234. If the pilot-actuated "pickle" switch 236 is closed at the time the contact 233 closes, the mechanism 234 will release a bomb 237.

OPERATION

The pilot's role in a low-altitude, loft-bombing mission utilizing the present invention is a vital one because he is the link which ties the computations and input data to geographical landmarks and he also is the link between the output information and the aircraft performance. Certain inputs such as TAS and magnetic heading are automatically entered into the system without attention from the pilot; but the on-course and cross-course corrections are supplied by the pilot as he ties in specific points in the computations to the geographical landmarks. The display unit 26 provides a means by which the pilot can monitor the end result of the navigational computations. The output information is essentially guidance instructions or commands which reach the pilot by visible or audible signals. The indicator 170 provides steering guidance up to one-third mile from pull-up; and thereafter, a yaw/roll error and g-error information for the pull-up maneuver. Warning lights and a pull-up tone provide timing information to the pilot of guidance events.

Prior to a bombing mission, the strip map 20 is prepared based on intelligence information developed from reconnaissance information about a target area. The map 20 is then loaded on a cartridge in the display unit 26. The map angle $\lambda$ and local variations $\phi$ are entered by the adjusting knobs 137 and 138, respectively. The map 20 is then aligned so that the target T lies directly under the horizontal index 34. The clutch 62 is then engaged and the pilot slews or transports the map 20 by means of the roller knob 29 until the start point S lies directly under the horizontal index 34. This stores the total distance to the target T in the steering angle unit 160. If the pilot has an estimate of the cross wind, he has the option of setting this value into the drift angle unit 120 with the cross wind adjusting knob 148. These settings are possible at any time before arrival at the start point S, after which the system is ready to begin a bombing mission.

Referring to the map 20 in FIG. 2, the low-altitude loft-bombing technique will be further described. When the start point S characterized by a large three-wing multi-story building first comes into view from the aircraft 10 flying toward the target area, the pilot adjusts the cursor adjusting knob 116 of the drift angle unit 120 to the predicted lateral distance from the start point S at which the aircraft 10 will be when it flies abreast of the start point S. For example, 16 miles to the left of the start point S, as represented by a typical ground track 238 on the map 20. Although it is preferable to have the predicted lateral distance setting made prior to the arrival abreast of the start point S, there is about a 1-mile leeway allowed beyond the start point S in which interval the initial setting could still be made. When the aircraft 10 comes abreast of the start point S, the pilot depresses the START button 80 to start the map motion and computer operation. From this point on, the pilot's task is to establish good computer tracking.

When the aircraft comes abreast of each preselected ground check point 1, 2, 3, 4 and 5, the pilot marks the aircraft 10 position by depressing the MARK button 77. If the on-course component of the map position does not agree with that of the geographical position of the aircraft 10 at that instant, that is, if the check point printed on the map is not under the horizontal index 34, two types of corrections occur. One is the step correction or skip of the map which brings the on-course components of the map position into alignment in both the NEAR and FAR ZONES. The other is the on-course rate correction which synchronizes aircraft speed in the FAR ZONE with the map speed. After about three marks in the FAR ZONE, correct on-course tracking is established. As noted before, an inadvertent omission of a mark at any of the check points is not harmful to the accuracy of the computation. Tracking continues in accordance with the corrective information accumulated up to the last marked check point.

From the start point S, tracking in the cross-course direction depends upon the initial lateral setting of the cursor 31, the estimated cross winds setting, and the automatic inputs of the compass 145 and TAS transducer 37. Corrected cross-course tracking is subsequently added. There being no preselected lateral check points, the pilot selects his own. A straight section of railroad or highway running in the same general direction as the line of flight makes an excellent lateral check point. For example, in map 20 the substantially parallel portion of highway between 50 and 52 miles from the target T in the FAR ZONE is estimated as 7 miles to the right of the aircraft 10 within that region. The pilot adjusts the cursor adjusting knob 116 so that the cross-course component of the map position agrees with his estimated geographical position, and then presses the lateral drift button 122 thereby entering a lateral correction into the drift angle unit 120. The drift angle $\delta$ is computed and is further combined with the heading $\eta$ to obtain the tracking as described above. After about two such lateral estimates in the FAR ZONE, correct tracking in the lateral direction is established.

The shaded area 21 on the map 20 alerts the pilot to an impending change in map scale. The aircraft 10 must not be tracking in the area 21 when the map 20 changes from the FAR ZONE scale to the NEAR ZONE scale. Otherwise the ground track line 238 will be lost beyond the lateral limits of the map 20 in the NEAR ZONE.

Once in the NEAR ZONE, the pilot marks at least once more before the pull-up maneuver. At one mile from the computed pull-up point 12, the green alert light 193 flashes. At two-thirds of a mile from the pull-up point 12, a second warning is given by the same light 193. At this point the pilot should begin to level the wings of the aircraft 10. At one-third of a mile from the pull-up point 12, the presentation on the vertical pointer 168 is changed from steering angle $\sigma$ to a combined signal of yaw and roll error. The horizontal pointer 176, which was horizontal just prior to the one-third mile point, drops abruptly and begins to rise gradually toward the horizontal position as the pull-up point 12 is approached. This rise represents a visible warning of the pull-up point 12. Between the one-third mile point and the pull-up point, the pilot should depress the "pickle" button 236. When the horizontal pointer 176 reaches zero, this signifies to the pilot his arrival at the computed pull-up point. In addition, the red indicator light 206 is turned on and an oral tone is presented to the pilot through the earphones 207. From this point on, the horizontal pointer 176 presents a programmed pull-up in terms of g-error. The acceleration transition in the illustrated example in FIG. 1 from one to four g's follows a negative cosine function of the ground distance traveled from the pull-up point 12. The four g-level is reached at a point which is about one-third of a mile after the pull-up point 12. Therefore, the pilot must apply full throttle and pull back on the control stick to accelerate the airplane in accordance with the programmed G schedule. So long as the pilot keeps the horizontal pointer 176 horizontal, he is properly controlling the transverse acceleration forces. Maintaining the vertical pointer 168 in a vertical position, thereby maintaining the wings of the aircraft 10 level during the pull-up, is imperative for an accurate bomb delivery.

During the pull-up maneuver, bomb release is automatically effected by the bomb release angle unit 210 without any attention from the pilot. However, bomb release may be signaled to the pilot by the red light 206 going out and the aural tone stopping. After bomb release, the yaw-roll indication is preserved until the "pickle" button 236 is released. The pilot then continues on an inside loop and half-roll to maneuver the aircraft away from the target T.

It will be observed that during the run-in phase and the pull-up maneuver, the pilot is presented with certain information. As a result of operation on monitored inputs plus pilot corrections, the computer system computes and presents a continuous track of the instantaneous map position on the display unit 26. The knowledge of the present position in relation to terrain features shown on the map 20 is very helpful for the recognition of corresponding terrain features on the ground, particularly of the check points 1, 2, 3, 4 and 5. Obstacle avoidance is another benefit of tracking information. The knowledge of present position in relation to future positions is also useful navigational information. For example, if the trend of the successive map positions foretells of possible entrance into the shaded area 21 on the map 20, the pilot can take appropriate action to avoid that area. Within the NEAR ZONE, the curved lines 22 guide the pilot into the region where the ballistic computations are valid. If the ground track indicates its possible intersection with one of these lines, the pilot knows that this intersection is the last point along that particular ground track from which he could maneuver by two successive standard rate turns into the region where the ballistic computation is valid.

Another type of information to the pilot is the steering angle $\sigma$. The steering angle $\sigma$ is presented on the vertical pointer 168 of the indicator 170 from the start point S up to one-third of a mile from pull-up point 12. Thus, the steering angle $\sigma$ presents valuable guidance information to the pilot for directing the aircraft 10 to the target T; and at one-third of a mile from pull-up the indicator 170 is responsive to the yaw and roll to aid the pilot in leveling the wings of the aircraft 10.

The apparatus of the present invention has novel features which depart from devices heretofore used in low-altitude loft-bombing techniques. Several of the important features of the navigational computer may be noted, such as a moving-map type of navigational aid which includes ample check points to eliminate the high dependence upon a single initial point, continuous ground tracking of the map position, steering to a target within a relatively wide approach corridor, and permissible wide variations in aircraft run-in speeds. The ballistic computer affords a variable pull-up point dependent upon a variable run-in speed and range wind, a programmed transition of transverse acceleration during pull-up, and a modification of the bomb release angle based on deviations in fall-off of velocity from the ideal to compensate for various errors accumulated after pull-up. Due to these features the low-altitude loft-bombing technique has been improved over the current techniques to the extent of greater reliability and accuracy of delivery of the bomb on a target, greater flexibility in maneuvering of the aircraft, and less demand on pilot skill and acuity.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. Apparatus for loft-bombing a selected target from an aircraft flying at any ground track and speed within a predetermined geographical approach corridor, irrespective of altitude or atmospheric conditions, comprising, in combination:

a display housing adapted to be mounted in the cockpit of the aircraft, a strip map of the corridor movable along the length thereof displayed in said housing and visible to the pilot, a first index fixed to said housing across the front of said map and normal to the length of said map for continuously indicating an instantaneous map position of the aircraft along the length of the corridor, a true airspeed responsive transducer for providing a signal proportional to true airspeed of the aircraft, map positioning means for integrating the true airspeed having an input connected to said transducer to receive said true airspeed signal and an output conected to said map for moving the latter along its length, step correction means for detecting distance error between the instantaneous map position and the instantaneous aircraft ground position having an input selectively connected to the output of said positioning means and having an output operatively connected to said positioning means for modifying the output therefrom, a timer for providing a signal proportional to total time elapsed, rate correction means for detecting a rate error between the instantaneous map speed and the instantaneous aircraft ground speed having inputs selectively connected to the output of said positioning means and the output of said timer and an output operatively connected to the input of said positioning means to modify the true airspeed signal, a second index normal to and movable across the length of said first index, compass means for providing a signal proportional to the aircraft heading, drift angle means for detecting the aircraft ground track bearing relative to the heading having inputs selectively connected to the outputs of said positioning means and a manual adjusting means and an output indicative of the aircraft drift angle, means for combining the heading and drift angle signals for providing an output signal indicative of the aircraft course bearing, a second index drive means for integrating the cross-course component of the true airspeed having inputs connected to the output of said combining means for receiving the course bearing and to said true airspeed transducer for receiving the true airspeed and having an output drivingly connected to said second index for moving the latter across said first index, steering angle means for detecting the aircraft-to-target bearing relative to the ground track having inputs respectively connected to the outputs of said positioning means and said second index drive means and having an output signal indicative of the steering angle, an indicator for displaying the steering angle means for receiving said output signal, pull-up computer means for providing a signal at the pull-up point having an input connected to the output of said positioning means and an output signal to the pilot, on-course wind correction means for detecting the difference in the aircraft pull-up distance from a predicted still-air condition having an input connected to the output of said transducer and an output operatively connected to said pull-up computer means for modifying the input thereto, $g$-programmer means for generating an acceleration transition schedule during pull-up having an input selectively connected to the output of said positioning means during pull-up and an output signal firstly indicative of the pull-up point and secondly indicative of the scheduled transverse acceleration, an indicator connected to the output of said $g$-programmer means and the output of a transverse accelerometer for providing a signal to the pilot of transverse acceleration error, a bomb release means operatively connected to said positioning means and a bomb rack for releasing a bomb therefrom during pull-up.

2. Apparatus for loft-bombing a selected target from an aircraft flying at any ground track and speed within a predetermined geographical approach corridor, irrespective of altitude or atmospheric conditons, comprising, in combination:
- a display housing adapted to be mounted in the cockpit of the aircraft,
- a strip map of the corridor movable along its length displayed in said housing and visible to the pilot,
- a first index fixed to said housing across the front of said map and normal to the length of said map for continuously indicating an instantaneous map position of the aircraft along the length of the corridor,
- a transducer means for providing a signal proportional to the true airspeed of the aircraft,
- map positioning means for integrating the true airspeed having an input connected to said transducer to receive said true airspeed signal and an output connected to said map for moving the latter along its length,
- a timer for providing a signal proportional to total time elapsed, distance and rate correction means for detecting distance error between the instantaneous map position and the instantaneous aircraft ground position and rate error between an instantaneous map speed and the instantaneous aircraft ground speed having inputs selectively connected to the output of said positioning means and the output of said timer and an output operatively connected to the input of said positioning means to modify the map position and speed,
- a second index normal to and movable across the length of said first index,
- compass means for providing a signal proportional to the aircraft heading,
- angle means including a manual adjusting means for providing an output signal indicative of the aircraft course bearing,
- a second index drive means for integrating the cross-course component of the true airspeed having inputs connected to said angle means for receiving the course bearing and to said true airspeed and having an output drivingly connected to said second index for moving the latter across said first index,
- pull-up computer means for providing a signal at the pull-up point having an input connected to the output of said positioning means and an output signal to the pilot,
- on-course wind correction means for detecting the difference in the aircraft pull-up distance from a predicted still-air condition having an input connected to the output of said transducer and an output operatively connected to said pull-up computer means for modifying the input thereto,
- g-programmer means for generating and indicating a g-transition schedule during pull-up having inputs selectively connected to an accelerometer and to the output of said positioning means during pull-up for providing a signal to the pilot of transverse acceleration error,
- a bomb release means operatively connected to a bomb rack for releasing a bomb therefrom during pull-up.

3. Apparatus for loft-bombing a selected target from an aircraft flying at any ground track and speed within a predetermined geographical approach corridor, comprising, in combination:
- a strip map of the corridor adapted to be displayed in the cockpit of the aircraft movable along its length,
- a first index fixed against movement across the front of said map and normal to the length of said map for indicating an instaneous map position,
- a transducer means for providing a signal proportional to the true airspeed of the aircraft,
- map positioning means for integrating the true airspeed having an input connected to said transducer to receive said true airspeed signal and an output connected to said map for moving the latter along its length,
- correction means for detecting distance error between the instantaneous map position and the instantaneous aircraft ground position having an input selectively connected to the output of said positioning means and having an output operatively connected to said positioning means for modifying the output therefrom,
- a second index normal to and movable across the length of said first index,
- compass means for providing a signal proportional to the aircraft heading,
- angle means including a manual adjusting means for providing an output signal indicative of the aircraft course angle,
- a movable index drive means for integrating the cross-course component of the true airspeed having inputs connected to said angle means for receiving the course angle and to said true airspeed transducer for receiving the true airspeed and having an output drivingly connected to said movable index for moving the latter across said fixed index,
- pull-up computer means for providing a signal at the pull-up point having an input connected to the output of said positioning means and an output signal to the pilot,
- range wind correction means for detecting the difference in the aircraft pull-up distance from a predicted still-air condition having an input connected to the output of said transducer and an output operatively connected to said pull-up computer means for modifying the input thereto,
- a bomb release means operatively connected to said positioning means and a bomb rack for releasing a bomb therefrom during pull-up.

4. Apparatus for loft-bombing a selected target from an aircraft flying at any ground track and speed within a predetermined geographical approach corridor, comprising, in combination:
- a corridor map adapted to be displayed in the aircraft movable in one direction,
- a fixed index across the front of said map and normal to the length thereof for indicating the instantaneous map position of the aircraft,
- map positioning means drivingly connected to said map responsive to the integrated corrected true airspeed,
- a movable index normal to the length of said fixed index, drive means connected to said movable index responsive to the integrated cross-course component of the true airspeed,
- pull-up computer means for providing a signal at the pull-up point having an input connected to the output of said map positioning means and an output signal to the pilot,
- range wind correction means for detecting the difference in the aircraft pull-up distance from a predicted still-air condition responsive to the true airspeed and having an output operatively connected to said pull-up computer means for modifying its input,
- a bomb release means operatively connected to said positioning means and a bomb rack for releasing a bomb therefrom during pull-up.

5. Apparatus for loft-bombing a selected target from an aircraft flying at any ground track and speed within a predetermined geographical approach corridor, irrespective of altitude or atmospheric conditions, comprising:
- a strip map of the corridor, said map having perforations at preselected check points corresponding to landmarks on the ground,
- a fixed index across the front of said map and normal to the length for indicating the instantaneous map position of the aircraft,
- map positioning means drivingly connected to said map responsive to the integrated corrected true airspeed,
- a movable index normal to the length of said fixed index, drive means connected to said movable index responsive to the integrated cross-course component of the true airspeed, means connected to said positioning means for intermittently correcting the said position at said preselected check points, steering computer means connected to said positioning means for computing steering information to the target, said steering computer means having an output signal to the pilot, pull-up computer means connected to said positioning means for computing a variable pull-up point as a function of the range wind, said pull-up computer means having an output signal to the pilot, means connected to said positioning means for indicating a transverse acceleration schedule during pull-up, and means connected to said positioning means for automatically releasing a bomb during pull-up.

6. Apparatus for loft-bombing a selected target from an aircraft flying at any ground track and speed within a predetermined geographical approach corridor, irrespective of altitude or atmospheric conditions, comprising:

a strip map of the corridor, said map having perforations at preselected check points corresponding to landmarks on the ground, a fixed index across the front of said map and normal to the length thereof for indicating the instantaneous map position of the aircraft, map positioning means drivingly connected to said map responsive to the integrated corrected true airspeed, a movable index normal to the length of said fixed index, drive means connected to said movable index responsive to the integrated cross-course component of the true airspeed, means connected to said positioning means for intermittently correcting the said position at said preselected check points, pull-up computer means connected to said positioning means for computing a variable pull-up point as a function of the range wind, said pull-up computer means having an output signal to the pilot, means connected to said positioning means for indicating a transverse acceleration schedule during pull-up, and means connected to said positioning means for automatically releasing a bomb during pull-up.

7. Apparatus for loft-bombing a selected target from an aircraft flying at any ground track and speed within a predetermined geographical approach corridor, comprising:

a strip map of the corridor, said map having perforations at preselected check points corresponding to landmarks on the ground, a fixed index across the front of said map and normal to the length for indicating the instantaneous position of the aircraft, map positioning means drivingly connected to said map responsive to the integrated corrected true airspeed, a movable index normal to the length of said fixed index, drive means connected to said movable index responsive to the integrated cross-course component of the true airspeed, means connected to said positioning means for intermittently correcting the speed and indicated position at said preselected check points, pull-up computer means connected to said positioning means for computing a variable pull-up point as a function of the range wind, said pull-up computer means having an output signal to the pilot, and means connected to said positioning means for automatically releasing a bomb during pull-up.

References Cited by the Examiner

UNITED STATES PATENTS

| | | | |
|---|---|---|---|
| 2,541,277 | 2/1951 | Omberg et al. | 235—61 |
| 2,598,096 | 5/1952 | Bailly | 346—8 |
| 2,814,199 | 11/1957 | Waldorf et al. | 343—5 |
| 2,823,585 | 2/1958 | Gray et al. | 89—1.5 |
| 2,898,809 | 8/1959 | Ryan | 89—1.5 |
| 2,985,373 | 5/1961 | Helgeson et al. | 235—150.2 |
| 2,988,960 | 6/1961 | Helgeson et al. | 89—1.5 |
| 2,995,984 | 8/1961 | Helgeson et al. | 89—1.5 |
| 3,033,084 | 5/1962 | Wheeler et al. | 89—1.5 |
| 3,088,372 | 5/1963 | Brink et al. | 89—1.5 |

BENJAMIN A. BORCHELT, *Primary Examiner.*

SAMUEL W. ENGLE, *Examiner.*